(12) United States Patent
Kania

(10) Patent No.: US 10,814,355 B2
(45) Date of Patent: Oct. 27, 2020

(54) COLLECTION BIN FOR AN IN-LINE PRODUCT INSPECTION SYSTEM, AND IN-LINE PRODUCT INSPECTION SYSTEM

(71) Applicant: Mettler-Toledo Safeline Ltd., Manchester (GB)

(72) Inventor: Michal Kania, Land O Lakes, FL (US)

(73) Assignee: Mettler-Toledo Safeline Ltd., Salford, Manchester (GB)

( * ) Notice: Subject to any disclaimer, the term of this patent is extended or adjusted under 35 U.S.C. 154(b) by 197 days.

(21) Appl. No.: 16/240,573

(22) Filed: Jan. 4, 2019

(65) Prior Publication Data
US 2019/0232339 A1 Aug. 1, 2019

(30) Foreign Application Priority Data

Feb. 1, 2018 (EP) .................................... 18154718

(51) Int. Cl.
*B07C 5/38* (2006.01)
*B07C 5/34* (2006.01)
(Continued)

(52) U.S. Cl.
CPC .................. *B07C 5/38* (2013.01); *B07C 5/16* (2013.01); *B07C 5/34* (2013.01); *B07C 5/36* (2013.01); *B07C 5/362* (2013.01); *G01F 23/292* (2013.01)

(58) Field of Classification Search
CPC .... B07C 5/38; B07C 5/36; B07C 5/16; B07C 5/362; B07C 5/00; B65G 47/34;
(Continued)

(56) References Cited

U.S. PATENT DOCUMENTS 3,661,255 A * 5/1972 Toth ........................ B07C 5/362
209/655
3,750,881 A 8/1973 Husome et al.
(Continued)

FOREIGN PATENT DOCUMENTS

FR 2792555 A1 10/2000

*Primary Examiner* — Patrick H Mackey
(74) *Attorney, Agent, or Firm* — Standley Law Group LLP; Jeffrey S. Standley; Stephen L. Grant

(57) ABSTRACT

A collection bin (2) for an in-line product inspection system (1) is arranged downstream of an inspection device (5) along a transport conveyor (4) for the inspected articles (8) and is positioned to receive articles that are pushed off the transport conveyor by an ejection device. The collection bin is configured as an enclosed compartment divided into a top part (11) and a bottom part (16). The top part is solidly attached to the supporting structure and includes a chute with an entry opening (13) facing towards the transport conveyor, and with a downward-sloped slide surface (14) leading to a bottom opening (15) of the chute. The bottom part, which serves to collect the ejected articles, is constrained to the supporting structure with limited guided mobility between a closed position where the open top of the receptacle lines up with the bottom opening, and with an open position where the bottom part is moved out from underneath the bottom opening of the chute so that the collected articles can be removed. A closure gate (18) which is hinged to the bottom part along a hinge axis (19) slides over the sloped slide surface when the bottom part is closed and slips out of the sloped slide surface into a position to block the bottom opening of the chute when the bottom part is opened.

16 Claims, 3 Drawing Sheets

(51) Int. Cl.
 *B07C 5/16* (2006.01)
 *B07C 5/36* (2006.01)
 *G01F 23/292* (2006.01)

(58) Field of Classification Search
 CPC .................. B65G 47/48; B65G 47/46; B65G 2201/0258; G01F 23/292
 See application file for complete search history.

(56) References Cited

U.S. PATENT DOCUMENTS

| | | | |
|---|---|---|---|
| 4,509,635 A * | 4/1985 | Emsley | B07C 3/082 |
| | | | 198/370.03 |
| 5,881,889 A * | 3/1999 | Poulsen | B07C 5/36 |
| | | | 209/657 |
| 6,227,376 B1 * | 5/2001 | Handel | B07C 5/36 |
| | | | 198/369.2 |
| 6,799,684 B2 | 10/2004 | Wooldridge | |
| 7,307,225 B2 | 12/2007 | Berger | |
| 7,600,643 B2 | 10/2009 | Georgitsis et al. | |
| 8,096,402 B2 * | 1/2012 | Chastain | B65G 47/493 |
| | | | 198/369.7 |
| 8,556,084 B1 * | 10/2013 | Snook | B65G 47/51 |
| | | | 209/651 |
| 8,890,018 B2 | 11/2014 | Jung et al. | |
| 9,617,063 B2 * | 4/2017 | Schwanitz | B07B 13/16 |
| 9,795,995 B2 * | 10/2017 | Zimmer | B65G 47/844 |
| 9,962,743 B2 * | 5/2018 | Bombaugh | B07C 3/02 |
| 10,577,194 B2 * | 3/2020 | Stronkhorst | B65G 47/844 |
| 10,712,000 B2 * | 7/2020 | Ozeki | F23G 5/444 |
| 2005/0133729 A1 | 6/2005 | Woodworth et al. | |
| 2009/0127074 A1 * | 5/2009 | Cavallo | B65H 29/22 |
| | | | 198/617 |

* cited by examiner

COLLECTION BIN FOR AN IN-LINE PRODUCT INSPECTION SYSTEM, AND IN-LINE PRODUCT INSPECTION SYSTEM

CROSS-REFERENCE TO RELATED APPLICATIONS

This application claims priority to European Patent Application 18154718.3, filed on 1 Feb. 2018, which is incorporated by reference as if fully recited herein.

TECHNICAL FIELD

The invention relates to the field of in-line inspection equipment, i.e. systems that are typically used for the inspection of articles in production and packaging lines. This includes for example—without implying any limitation—check-weighing conveyor scales, metal detector systems, or X-ray scanner systems. Product inspection systems of this kind, which are used to identify underweight or overweight articles or to detect foreign objects and contaminants in packaged foods or pharmaceutical products, belong to the known state of the art. Typically in a system of this kind, a transport conveyor such as a belt conveyor or carousel conveyor transports the articles through the inspection apparatus where they are scanned and/or weighed while in motion.

BACKGROUND

A product inspection system normally includes or is operatively connected to an ejection mechanism which is arranged downstream of the inspection device and serves to remove articles that didn't meet the inspection criteria, so that the stream of articles continuing down the line contains only acceptable articles. The ejection mechanism causes the ejected articles to be moved off the transport conveyor and to be segregated in a separate location for further investigation, disposal or other special treatment. Typically, as in the case of the present invention, the ejected articles are pushed off sideways from the transport conveyor into a collection bin where they are temporarily held for further disposition.

Product inspection systems can perform a binary accept/reject sorting of articles, or they can also sort articles into more than two classes. In the latter case, a plurality of ejection devices can be employed for example to push the articles from the transport conveyor into different collection bins corresponding to significant underweight, marginal underweight, marginal overweight, and significant overweight, with the acceptable articles remaining on the transport conveyor.

An example of an automated filling and handling system for laboratory vials is described in US 2005/0133729 A1. A "shucker" device pushes the reject vials off a conveyor carousel onto a reject chute which drops the vials into a collection bin.

A system for inspecting small articles for correct coloration and segregating rejected articles is described in U.S. Pat. No. 3,750,881. The inspected articles are sliding down an inclined chute which leads to a bin for accepted articles. When a reject article comes down the chute, it is deflected sideways from the main chute into a reject chute by a puff of compressed air, so that it slides down the reject chute into a collection bin.

As another example, in WO 2011/068478 A1 a system and method are described for inspecting and sorting integrated circuit units where batches of units are transported together in holding frames from one inspection station to another. Units are handled by picking mechanisms which put each unit according to its respective inspection result into a "good" bin, a "rework" bin, or a "reject" bin.

As a further example of the prior art, an in-line product inspection system with a checkweigher and a metal detector is described and illustrated in FIG. 2 of DE 10357982 A1. Along an outfeed conveyor belt, i.e. downstream of the checkweigher and metal detector, two reject mechanisms are arranged, one for over/underweight articles and the other for metal-contaminated articles. The reject mechanisms move the rejected articles sideways off the conveyor belt into laterally arranged collection bins.

While all of the foregoing examples of the state of the art illustrate product inspection systems that can be equipped with collection bins, the present invention is directed in particular at a collection bin for a product inspection system of the type described in the immediately preceding paragraph, where rejected articles are pushed sideways off the conveyor path for example by a pneumatically actuated push ram, a deflecting barrier swinging into the path, a blast of compressed air, or any other suitable ejector means acting in the transverse direction of the conveyor path, and where the rejected articles are received by a collection bin arranged laterally of the conveyor path.

At the point where a collection bin is filled up with ejected articles, it needs to be emptied. However, unless the conveyor line is stopped while an attendant person removes the articles from the bin, further articles may be ejected from the transport path while the collection bin is being emptied. Thus, a potentially hazardous situation arises as the person reaching with his hands into the bin could be hit by an ejected article. Considering the high speed of ejection and a possible article weight as high as 5 kg, it is obvious that this situation calls for effective measures to prevent work injuries.

Also, if the operator opens or removes the collection bin in order to reach with his hands into the chute, for example to free up articles that got stuck in the chute or in the ejection device, this creates a further risk of injury from moving machine parts of the ejection device or the belt conveyor as well as—in the case of an X-ray scanner system—from exposure to stray radiation escaping from the inspection compartment into the area of the ejection device and ejection chute.

It is therefore the object of the present invention to come up with a concept for a collection bin that obviates the risk of operator injuries associated with opening or removing the collection bin during operation of the inspection system.

SUMMARY

This task is solved by a collection bin according to the independent claim 1. Advantageous embodiments and detail features of the invention are set forth in the dependent claims.

A collection bin of the generic type envisioned by the invention is designed for use in an in-line product inspection system that includes a supporting structure, a transport conveyor, an inspection device, an ejection device, and one or more of said collection bins, wherein the transport conveyor serves to continuously transport articles along a transport path through the inspection device, the inspection device serves to inspect the articles while they are in motion and to select individual articles according to given inspection criteria, the ejection device is arranged at the transport path downstream of the inspection device and serves to eject the selected articles from the transport conveyor, and wherein said collection bin is arranged laterally adjacent to the transport conveyor and positioned to receive the ejected articles, with a rear side of the collection bin facing towards, and a front side facing away from, the transport conveyor.

The collection bin as claimed according to the present invention is configured as an enclosed compartment divided into a top part and a bottom part. The top part is solidly attached to the supporting structure and includes a chute with an entry opening of the chute facing towards the transport conveyor, and with a downward-sloped slide surface leading to a bottom opening of the chute. The bottom part, which includes an open-top receptacle that serves to collect the ejected articles, is constrained to the supporting structure with limited, guided mobility between a closed position where the open top of the receptacle lines up with the bottom opening of the chute, and with an open position where the bottom part is moved out from underneath the bottom opening of the chute so that the collected articles can be taken out of the receptacle. In particular, the collection bin includes a closure gate which is hinged to the bottom part along a hinge axis at a rim section of the top opening, wherein said rim section is located on a trailing side of said movement from the closed to the open position, and wherein the closure gate is designed to be overlaid on, or interlaid with, the sloped slide surface of the chute when the bottom part is in the closed position, and to slip out of the sloped slide surface into a position to block the bottom opening of the chute when the bottom part is in the open position.

As the movement of the bottom part from the closed to the open position is mechanically coupled with the simultaneous blocking of the bottom opening of the chute, ejected articles are held back in the top part as long as the bottom part is in the open position, whereby the aforementioned risk of injury from an ejected article is avoided. Furthermore, by blocking the bottom opening of the chute, the closure gate also works as a safety barrier to prevent the operator from reaching through the chute into the ejection device and transport conveyor and thereby incurring a risk of being injured by moving machine parts and/or—in the case of an X-ray scanner system—by exposure to stray radiation escaping from the inspection compartment into the area of the ejection device and ejection chute.

In an advantageous embodiment of the collection bin according to the invention, the limited, guided mobility of the bottom part between the closed position and the open position is realized by connecting the bottom part to the supporting structure through a hinge along a tilt axis at a bottom edge on the rear side of the bottom part, so that the bottom part can be tipped about said tilt axis from an upright, closed position where the open top of the receptacle aligns with the bottom opening or the chute and where the closure gate is overlaid on, or interlaid with, the sloped slide surface of the chute, to an open position where the bottom part is tilted away from underneath the top part so that the receptacle is accessible through its open top and the bottom opening of the chute is blocked by the closure gate.

Alternatively, the limited, guided mobility of the bottom part between the closed position and the open position can also be advantageously realized in an embodiment where the bottom part is configured as a drawer gliding in slide tracks that are solidly attached to the top part and/or to the supporting structure. This allows the bottom part to be pulled out frontwards from the closed position to the open position. Again, in keeping with the inventive concept, when the bottom part is in the closed position where the open top of the receptacle aligns with the bottom opening of the chute, the closure gate is overlaid on, or interlaid with, the sloped slide surface of the chute, and when the bottom part is in the open position where the bottom part is pulled out from underneath the top part so that the receptacle is accessible through its open top, the bottom opening of the chute is blocked by the closure gate.

In a preferred embodiment of the invention, the open-top receptacle in which the ejected articles are collected is configured as a container box that is integral to the bottom part.

In another advantageous embodiment of the invention, the open-top receptacle in which the ejected articles are collected is configured as a container box or a container bag that can be inserted into, or releasably attached to, the bottom part.

As an advantageous additional feature, the collection bin can be equipped with an overfill-warning sensor. The latter could be realized for example with a light emitter/sensor and a light reflector located at diametrically opposite positions of the bottom part, wherein when the collected articles are piled up high enough in the receptacle, a light beam emitted by the light emitter/sensor and reflected by the light reflector is, and continues to be, interrupted, which causes the overfill-warning sensor to generate an overfill-warning signal.

As a further advantageous feature, the overfill-warning sensor could additionally be employed as a function-verification sensor. In the aforementioned emitter/sensor/reflector arrangement, a transient break in the light beam due to an ejected article falling into the receptacle causes the overfill-warning sensor to generate an ejection verification signal, while the absence of a an ejection verification signal or an overfill signal subsequent to an activation of the ejection device indicates a malfunction of the ejection device, a jammed-up article in the chute, or a failure of the warning sensor.

In addition to the collection bin in its embodiments according to the foregoing description, the scope of the present invention also includes any in-line product inspection system that is equipped with one or more of the collection bins described and claimed herein.

In-line product inspection systems with one collection bin and an associated ejection device are commonly used to perform a binary accept/reject sorting of articles, wherein acceptable articles remain on the transport conveyor and rejected articles are moved from the transport conveyor to the collection bin by the ejection device.

In-line product inspection systems with a plurality of collection bins and associated ejection devices can be used to sort articles into different attribute classes. Each collection bin and associated ejection device is assigned to a different attribute class. The inspection device determines the attribute class to which an article belongs and the article is accordingly directed to the respective collection bin or is allowed to remain on the transport conveyor. For example, an in-motion check-weighing system can be operated as a weight classifier system sorting the articles into different weight classes.

BRIEF DESCRIPTION OF THE DRAWINGS

The collection bin according to the invention will be described hereinafter through embodiments shown schematically in the drawings, with elements that are identical from one drawing to the next carrying the same reference symbols, wherein.

DETAILED DESCRIPTION

Figure 1:
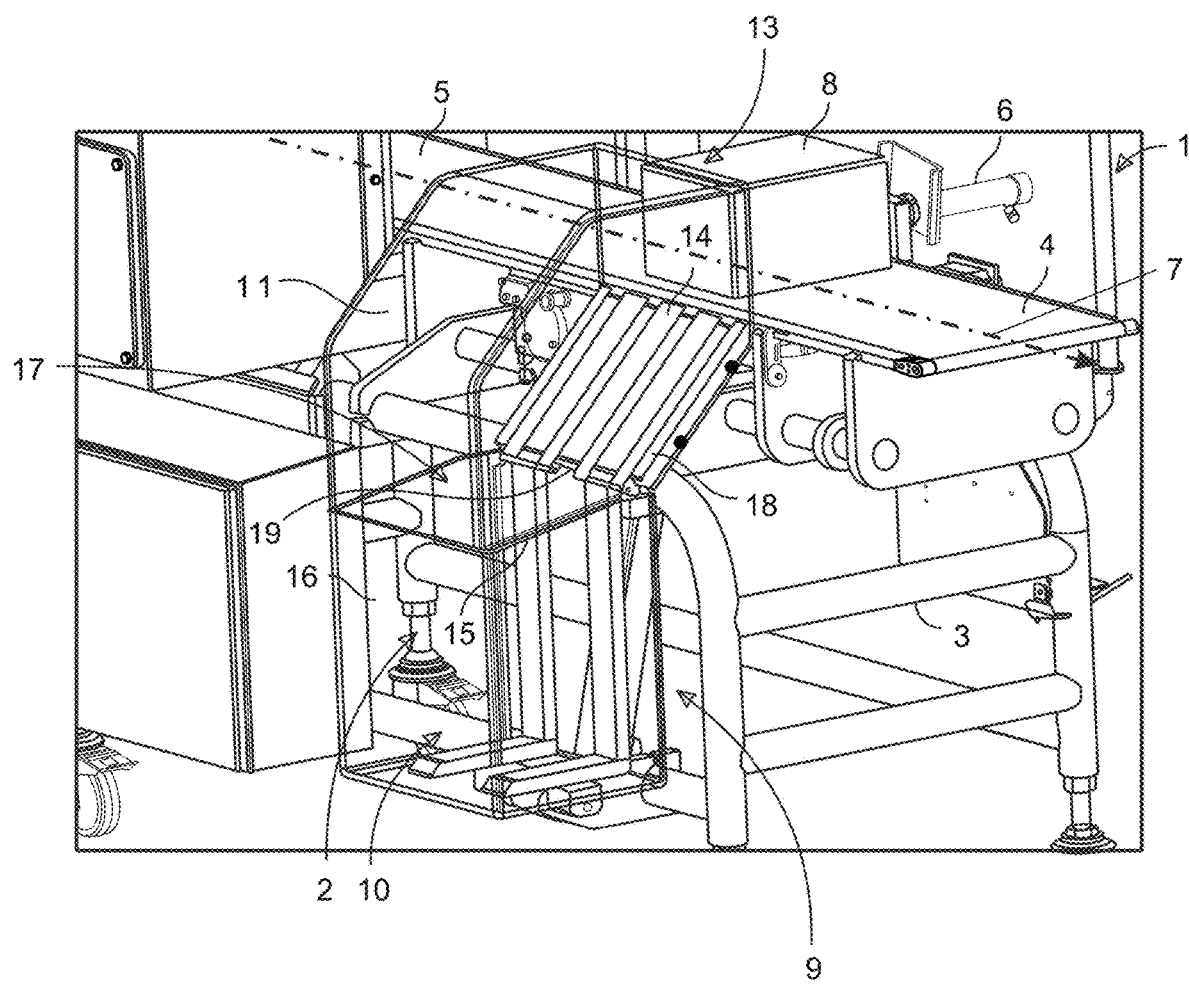
FIG. 1 shows a perspective view of the collection bin according to the invention installed in an in-line product inspection system, with the bottom part of the collection bin in the closed position.

FIG. 1 shows a partial representation of an in-line product inspection system 1, for example a metal-detection system, with a collection bin 2 installed laterally to the side of a transport conveyor 4 with a supporting understructure 3. The transport conveyor 4, in this case a belt conveyor, moves articles 8 through an inspection device 5 along the transport path 7 symbolized by a broken line with an arrow head indicating the transport direction. The inspection device 5 identifies articles 8 that are to be directed to the collection bin 2 by the ejection device 6, symbolized here by a push ram 6 which moves the selected article 8 sideways off the transport path 7 into the collection bin 2. The collection bin 2 is divided into a top part 11 and a bottom part 16. The top part 11 is configured as a chute 11 with an entry opening 13, a downward-sloped slide surface 14, and a bottom opening 15. The bottom part 16 is configured as an open-top container 16 or can include an open-top container 16 as an insert. FIG. 1 shows the collection bin 2 in the closed condition, where the open top 17 of the container 16 lines up with the bottom opening 15 of the chute 11. The closure gate 18, which is hinged to the rearward rim section of the bottom part along the hinge axis 19, is realized here as a grid of parallel bars which, in the closed position, are resting in corresponding channels of the ribbed slide surface 14.

Figure 2:
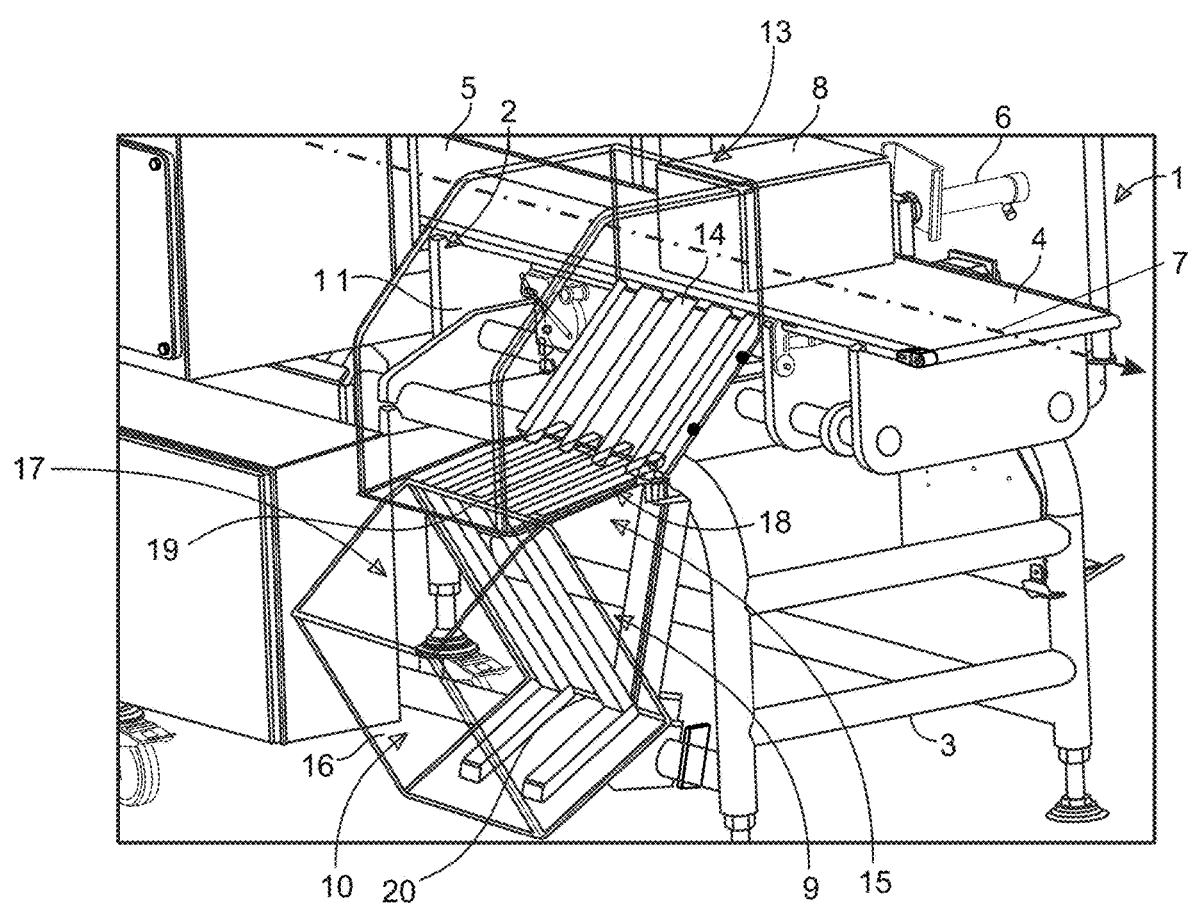
FIG. 2 shows a perspective view of the collection bin of FIG. 1, with the bottom part of the collection bin in the open position.

In FIG. 2, the bottom part 16 of the collection bin 2 is in the open position, i.e. tilted forward about the tilt axis 20. The parallel bars of the closure gate 18 which is hinged to the bottom part along the hinge axis 19 have been pulled out of the channels of the ribbed slide surface 14 and are now blocking the bottom opening 15 of the chute 11, so that ejected articles are held back in the top part 11 as long as the bottom part 16 is in the open position.

Figure 3:
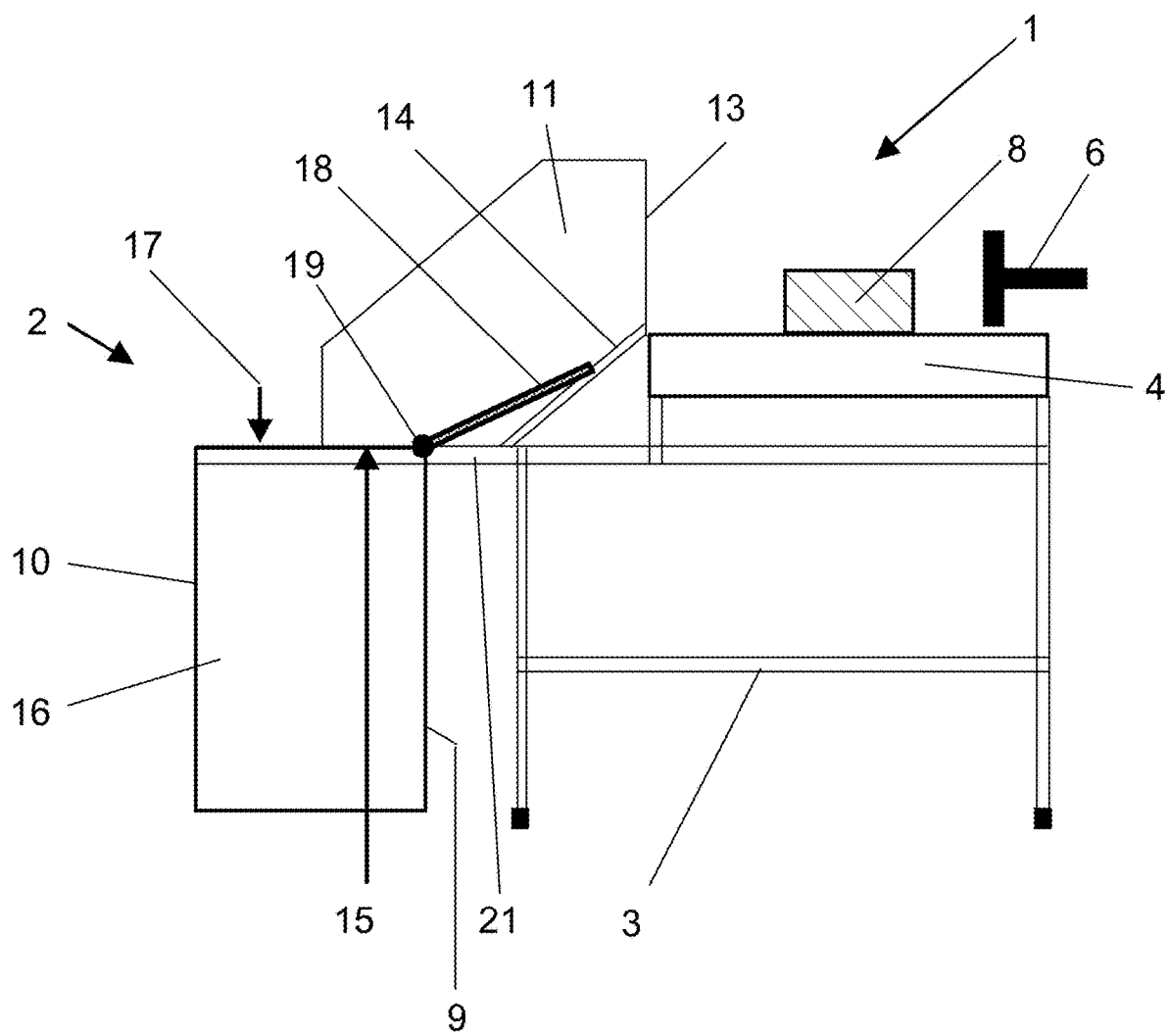
FIG. 3 schematically illustrates an alternative configuration of the bottom part of the collection bin in a half-way opened position.

FIG. 3 shows an alternative embodiment of the collection bin 2, where the bottom part 16 is configured as a drawer 16 moving on glide tracks 21 which can be attached to the top part 11 and/or to the understructure 3. The drawer 16 in this illustration has been pulled halfway forward to the open position, and the closure gate 18, which is hinged to the drawer 16 along the hinge axis 19, has slid partway down the sloped slide surface 14. As all of the other elements in FIG. 3 have already been covered above, their description remains the same and is therefore not repeated here.

While the invention has been described through the presentation of several specific embodiments, it is considered self-evident that numerous additional variants could be developed based on the teachings of the present invention, for example by combining the features of the individual embodiments with each other and/or by exchanging individual functional units of the embodiments against each other. For example, it will be obvious to those skilled in the relevant art that the limited guided mobility of the bottom part of the collection bin could be realized also in other ways than the tilting receptacle or the drawer-style receptacle shown in the drawings. As another example, the closure gate, which is shown in the illustrations as a grid of parallel bars, could also be realized as a simple flat plate that is overlaid on a likewise flat sloped slide surface of the chute. It should therefore be understood that all such variations and combinations are considered within the scope of the present invention.

What is claimed is:

1. A collection bin, for an in-line product inspection system, to collect articles after an inspection thereof, the inspection system comprising a supporting structure, a transport conveyor, an inspection device, and an ejection device, wherein the transport conveyor continuously transports the articles through the inspection device along a transport path for inspection while the articles are in motion, the inspection device arranged to select, according to predetermined inspection criteria, some of the articles for ejection, wherein the ejection device, arranged at the transport path downstream of the inspection device, ejects the selected articles from the transport conveyor into one of at least one collection bins, wherein each of the collection bin comprises:

an enclosed compartment divided into:
　a top part, comprising a chute and adapted for solid attachment to the supporting structure, the chute having an entry opening that faces towards the transport conveyor and with a downward-sloped slide surface that leads to a bottom opening of the chute; and
　a bottom part, which comprises an open-top receptacle to collect the ejected articles, the bottom part adapted to be constrained to the supporting structure with limited, guided mobility between a closed position, in which the open top of the receptacle lines up with the bottom opening of the chute, and an open position, in which the bottom part is moved out from underneath the bottom opening of the chute, for the articles collected therein to be taken out of the receptacle; and
a closure gate, hingedly attached to the bottom part along a hinge axis at a rim section of the top opening, the rim section being located on a trailing side of the movement from the closed position to the open position, the closure gate being designed to be overlaid on, or interlaid with, the sloped slide surface of the chute when the bottom part is in the closed position, and to slip out of the sloped slide surface into a position to block the bottom opening of the chute when the bottom part is in the open position;
wherein the collection bin is arranged laterally adjacent to the transport conveyor and positioned to receive the ejected articles, with a rear side of the collection bin facing towards, and a front side facing away from, the transport conveyor.

2. The collection bin of claim 1, wherein:
the bottom part is rotatably hinged to the supporting structure along a tilt axis at a bottom edge on the rear side of the bottom part, allowing the bottom part to be tipped about the tilt axis from the upright, closed position, in which the open top of the receptacle aligns with the bottom opening of the chute and where the closure gate is overlaid on, or interlaid with, the sloped slide surface of the chute, to the open position where the bottom part is tilted away from underneath the top part so that the receptacle is accessible through the open top thereof and the bottom opening is blocked by the closure gate.

3. The collection bin of claim 2, further comprising an overfill-warning sensor arranged to generate an overfill-warning signal when the collected articles exceed a fill capacity level in the receptacle.

4. The collection bin of claim 3, wherein the overfill-warning sensor comprises a light emitter/sensor and a light reflector located at a diametrically opposite positions of the bottom part, such that when the collected articles exceed the fill capacity level, a light beam emitted by the light emitter/sensor and reflected by the light reflector is, and continues to be, interrupted, which causes the overfill-warning sensor to generate the overfill-warning signal.

5. The collection bin of claim 4, wherein the overfill-warning sensor is operates as a function-verification sensor, wherein a transient break in the light beam due to an ejected article falling into the receptacle causes the overfill-warning sensor to generate an ejection verification signal, and wherein the absence of an ejection verification signal or an overfill signal subsequent to an activation of the ejection device indicates a malfunction of the ejection device, a jammed-up article in the chute, or a failure of the warning sensor.

6. The collection bin of claim 1, wherein:
the bottom part is configured as a drawer that glides in slide tracks that are solidly attached to at least one of the top part and the supporting structure, so that the bottom part can be pulled out frontwards from the closed position where the open top of the receptacle aligns with the bottom opening or the chute and where the closure gate is overlaid on, or interlaid with, the sloped slide surface, to the open position where the bottom part is pulled out from underneath the top part so that the receptacle is accessible through the open top thereof, and where the bottom opening is blocked by the closure gate.

7. The collection bin of claim 1, wherein the open-top receptacle further comprises a container box that is integral to the bottom part.

8. The collection bin of claim 1, wherein the open-top receptacle further comprises a container box that can be inserted into, or releasably attached to, the bottom part.

9. The collection bin of claim 1, wherein the open-top receptacle further comprises a container bag that can be inserted into, or releasably attached to, the bottom part.

10. The collection bin of claim 1, further comprising an overfill-warning sensor arranged to generate an overfill-warning signal when the collected articles exceed a fill capacity level in the receptacle.

11. The collection bin of claim 10, wherein the overfill-warning sensor comprises a light emitter/sensor and a light reflector located at a diametrically opposite positions of the bottom part, such that when the collected articles exceed the fill capacity level, a light beam emitted by the light emitter/sensor and reflected by the light reflector is, and continues to be, interrupted, which causes the overfill-warning sensor to generate the overfill-warning signal.

12. The collection bin of claim 11, wherein the overfill-warning sensor operates as a function-verification sensor, wherein a transient break in the light beam due to an ejected article falling into the receptacle causes the overfill-warning sensor to generate an ejection verification signal, and wherein the absence of an ejection verification signal or an overfill signal subsequent to an activation of the ejection device indicates a malfunction of the ejection device, a jammed-up article in the chute, or a failure of the warning sensor.

13. A system for in-line product inspection, comprising at least one collection bin according to claim 1, as well as an ejection device associated with each of the collection bins.

14. The system of claim 13, comprising one collection bin, wherein the inspection system is operable to perform a binary accept/reject sorting of articles, such that acceptable articles remain on the transport conveyor and rejected articles are moved from the transport conveyor to the collection bin by the ejection device.

15. The system of claim 13, comprising a plurality of collection bins and associated ejection devices, wherein the collection bins and associated ejection devices are each assigned to different attribute classes of the inspected articles, such that the inspection device determines the attribute class to which an article belongs, and the article is accordingly directed to the respective collection bin or is allowed to remain on the transport conveyor.

16. The system of claim 15, wherein the system operates as a weight classifier system, sorting the articles into weight classes.

* * * * *